United States Patent
Lin et al.

(10) Patent No.: US 6,269,402 B1
(45) Date of Patent: Jul. 31, 2001

(54) METHOD FOR PROVIDING SEAMLESS COMMUNICATION ACROSS BEARERS IN A WIRELESS COMMUNICATION SYSTEM

(75) Inventors: Jyh-Han Lin, Coral Springs, FL (US); Wu-Hon Francis Leung, Downers Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/119,135

(22) Filed: Jul. 20, 1998

(51) Int. Cl.[7] ........................................... G06F 15/16
(52) U.S. Cl. ..................... 709/227; 709/201; 709/202; 709/203; 709/227; 709/228; 709/229; 709/247; 395/114; 370/431; 340/825.01
(58) Field of Search ............................ 709/227–228, 709/201–203, 229, 247; 395/114; 370/431; 340/825.01

(56) References Cited

U.S. PATENT DOCUMENTS

| | | | |
|---|---|---|---|
| 5,553,242 | * | 9/1996 | Russell et al. .................. 395/200.12 |
| 5,719,562 | * | 2/1998 | Fawcett ........................... 340/825.44 |
| 5,771,353 | * | 6/1998 | Eggleston et al. .................... 709/227 |
| 5,781,550 | * | 7/1998 | Templin et al. ..................... 370/401 |
| 5,790,800 | * | 8/1998 | Gauvin et al. ....................... 709/227 |
| 5,835,724 | * | 11/1998 | Smith .................................. 709/227 |
| 5,854,901 | * | 12/1998 | Cole et al. ........................... 709/345 |
| 5,889,962 | * | 3/1999 | Hanif et al. .......................... 709/228 |
| 5,951,694 | * | 9/1999 | Choquier et al. ...................... 714/15 |
| 6,006,268 | * | 12/1999 | Coile et al. .......................... 709/227 |

OTHER PUBLICATIONS

WAP WSP Version Apr. 30, 1998 "Wireless Application Protocol, Wireless Session Protocol Specification" pp. 1–95.

* cited by examiner

Primary Examiner—Ayaz Sheikh
Assistant Examiner—Thu Ha Nguyen
(74) Attorney, Agent, or Firm—Scott M. Garrett

(57) ABSTRACT

A communication session is established between a client (102) and a server (104) over a first bearer network (106). A session identifier is produced (304), which is compressed (306). Messages or packets sent between the client and server during a first connection include the compressed session identifier and a first envelope identifier. At some time the first connection is terminated, and a second connection is initiated on a second bearer network. At the occurrence of the break, at both the client and server, a session transition control block is set up and includes the first envelope identifier. The session transition control block is used to map messages or packets received after the break to the correct session after resuming the session over a second connection with a second envelope identifier.

11 Claims, 4 Drawing Sheets

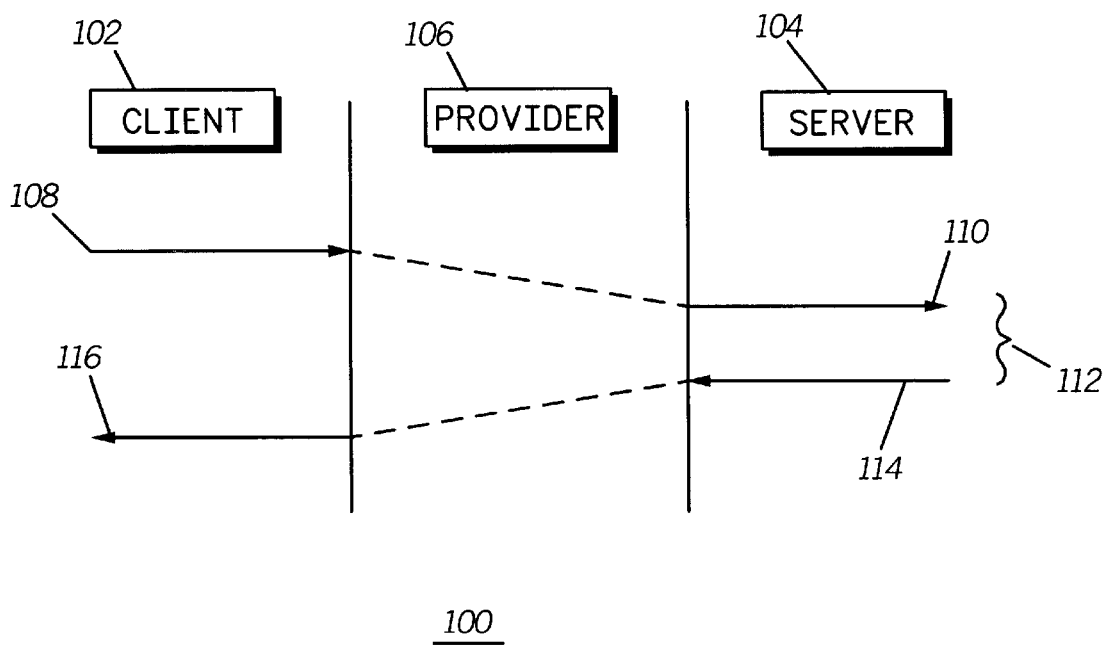
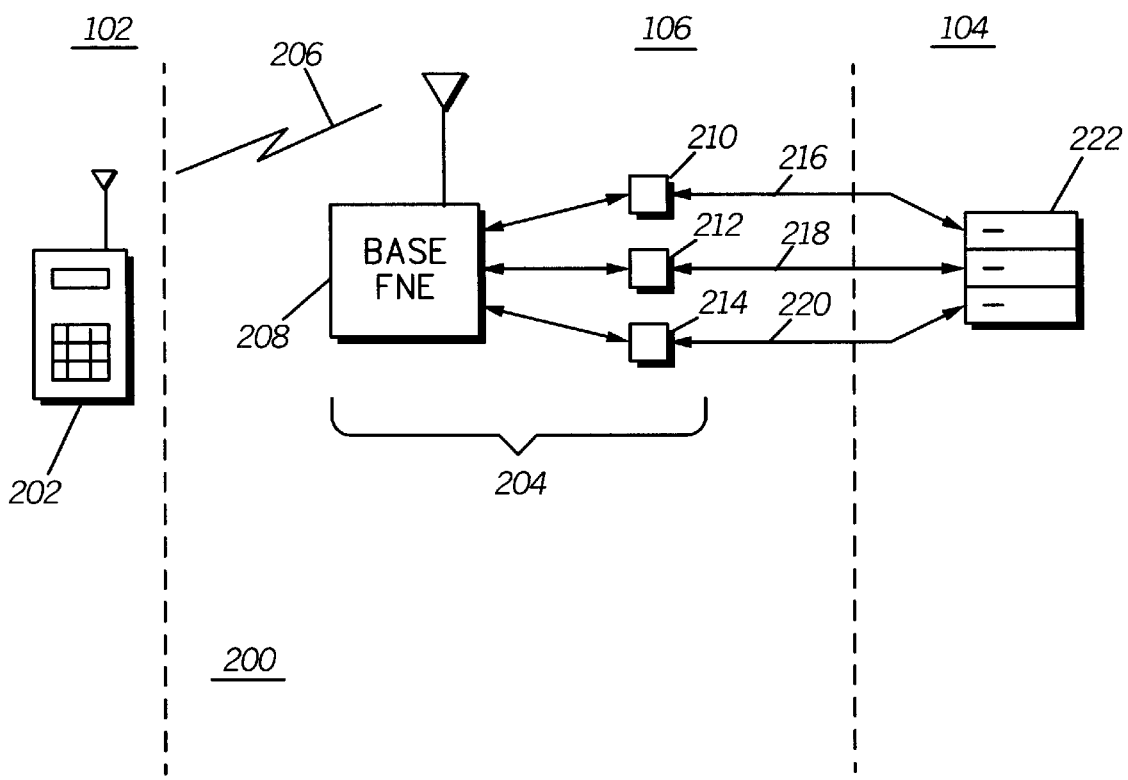

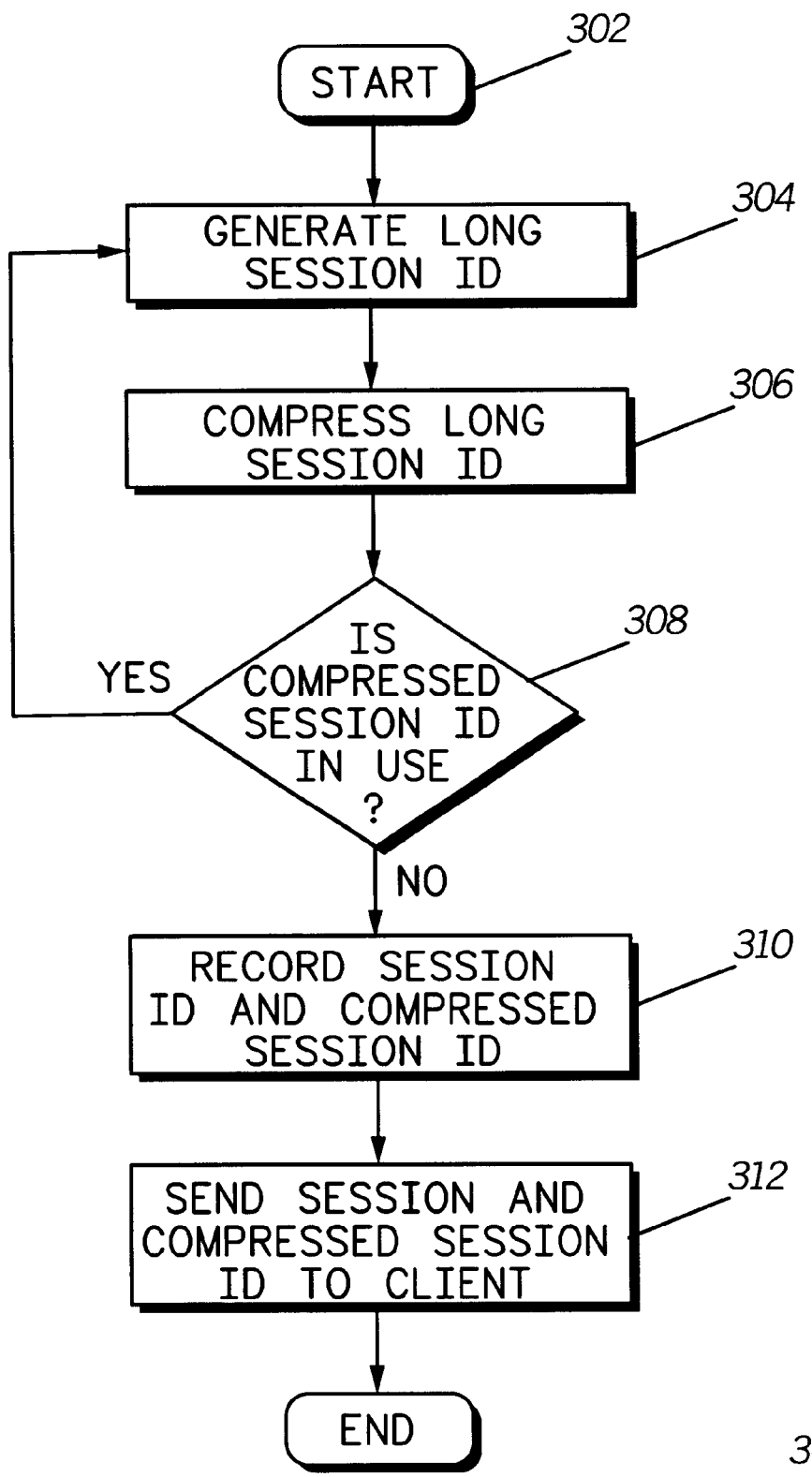

METHOD FOR PROVIDING SEAMLESS COMMUNICATION ACROSS BEARERS IN A WIRELESS COMMUNICATION SYSTEM

TECHNICAL FIELD

This invention relates in general to network services provided over communication systems, and more particularly to session management over communication systems.

BACKGROUND OF THE INVENTION

There is an increasing demand for network based information services, and one of the greatest areas for growth is in mobile or wireless information services. Mobile information services are delivered over wireless communication networks such as, for example, digital cellular communication systems. Presently, voice communication accounts for most of the traffic carried by such systems, but the ability of digital systems to provide other types of data is providing opportunities for system operators to compete with land based networks in offering data services to mobile customers. However, there are a number of issues to be resolved with wireless mobile data networks.

In a mobile environment, it is much more likely that a communication session between a client, such as a mobile station, and a server will be interrupted. Interruptions occur for a variety of reasons, such as during hand off between serving cells, or during periods of poor signal quality. During hand-off there is often a brief period during which no information is exchanged. This type of interruption, because it is predictable and expected, has a minimal effect on communication. However, unexpected interruptions from poor signal quality, or dropped connections between the mobile station and a base station, are much more difficult to deal with. Examples of such an interruption would include when the mobile station passes through a tunnel, when the battery of the mobile station runs out of charge, server overloads, and so on.

Typically, when a connection is lost, the user would have to re-connect and engage in another session with server. This occurs in land line networks as well, such as when point to point protocol (PPP) computer dial in modem connections are dropped by the telephony carrier. When a dial in connection is dropped, the user must dial in again, usually receiving a new address, and establish a new communication session. Any transfer of data in progress when the session was interrupted is lost. The same is true of mobile network connections. If a connection between the mobile station and the fixed network equipment is lost, it is likely that the communication session is not recoverable.

The notion of session is defined in the Open System Interconnection (OSI) model as layer 5 of the seven defined layers. The loss of a session because of a problem in a lower layer is not a requirement by any means, and in fact there are proposed specifications implying that a session should be persistent, and at least tolerant of suspensions and redirections initiated by the client, server, or bearer network. The Wireless Session Protocol Specification of Version 30 (April, 1998) of the Wireless Application Protocol, the disclosure of which is hereby incorporated by reference, describes a session model that provides for suspend and resume operations.

A bearer network is defined as the network over which data is carried, including protocol as well as physical media. For example, a typical desktop computer is capable of communicating over a circuit data/PPP bearer to a server, as well as by a LAN such as ethernet. There is an increasing number of mobile communication devices made which are capable of using several bearer network such as packet data, circuit data, short message service (SMS), all as understood in the art.

The ability of a session to float or roam from one bearer network to another would greatly simplify the operations of higher layer protocols in mobile communication systems. This would be possible by using a suspended session, switching bearer networks, the resuming the session. If a session were likewise automatically suspended upon an interruption, then resumable upon reconnection, a great deal of time could be saved by mobile users experiencing such interruptions, and the session would appear seamless.

A couple complications arise, however, as to how to go about implementing a seamless communication session, survivable among bearers and across multiple connections. For example, in wide area packet networks, such as the internet, packets or messages may linger in the network. This is because such networks are operate according to a "store and forward" principle. If the session changes bearers, or if the address of the client changes upon reconnection, the envelope identifier that lingering messages carry will no longer be valid. Consequently, with any current session protocol, these packets will be discarded upon reaching their destination. By envelope identifier it is meant a peer address quadruplet consisting of the client address, client port number, server address, and server port number. The server uses the envelope identifier to determine to which session the packet belongs. Typically, as in the proposed Wireless Application Protocol, a session identifier is a 32 bit field, and is considered too long to include in each packet, thus only the envelope identifier is used, placing the burden of matching packets with sessions on the network equipment.

A second problem that occurs is the problem of resolving aliases due to dynamic address assignment, as in PPP connections. When a circuit data connection is interrupted, and later resumed, the client will typically get a new address assignment, changing the envelope identifier it uses in sending packets. Packets with the old envelope identifier will be lost, resulting in the user having to re-transmit requests. Therefore, there is a need for a means to resolve the issues of lingering messages and changes in envelope identifiers in a communication system.

BRIEF DESCRIPTION OF THE DRAWINGS

FIG. 1 shows a signal flow diagram for establishing a mobile communication session, in accordance with the invention;

FIG. 2 shows a system diagram of a mobile communication system, in accordance with the invention;

FIG. 3 shows a flow chart diagram of a method for providing a compressed session identifier, in accordance with the invention;

DETAILED DESCRIPTION OF A PREFERRED EMBODIMENT

Figure 4:
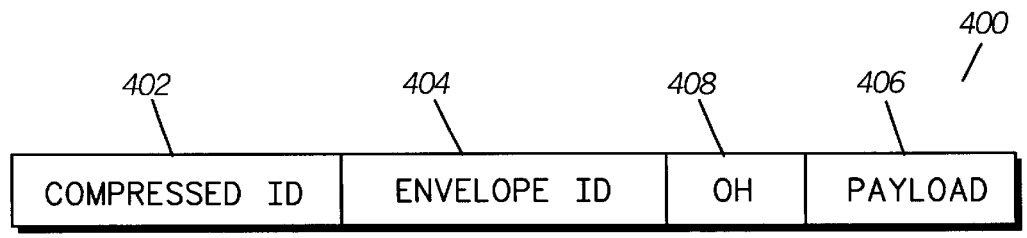
FIG. 4 shows a packet format for a mobile communication system, in accordance with the invention.

While the specification concludes with claims defining the features of the invention that are regarded as novel, it is believed that the invention will be better understood from a consideration of the following description in conjunction with the drawing figures, in which like reference numerals are carried forward.

The present invention solves the deficiencies of the prior art, such as lingering messages and alias resolution, in two ways that may be used independently or together. The first way the present invention address these problems is with the use of a compressed session identifier. The compressed session identifier is derived from the full session identifier selected by the server upon a request for a session by a client. The compressed session identifier is substantially smaller than the full session identifier to which it corresponds, and may be sent along in each outgoing packet by either the server, client, or both. The second way in which the present invention addresses the problems is in the construction of a session transition control block. Upon receiving an indication of an interruption of communication between the client and server, both the client and server set up a session transition control block in anticipation of resuming communication with different network parameters. Once communication is resumed after the interruption, the session transition control block is completed, and used to properly route stored or lingering messages from the communication activity prior to the interruption. These methods provide a way to achieve seamless communication in a mobile communication system.

Referring now to FIG. 1, there is shown a signal flow diagram 100 for establishing a mobile communication session, in accordance with the invention. The communication occurs between a first peer, such as a client 102, and a second peer, such as a server 104, over a provider or bearer network 106. To initiate the communication activity, the client sends in a request 108 to the server, over the selected bearer network. The server receives the request 110, and determines if it will grant the request. The sending 108 and receiving 110 are vertically staggered to indicate propagation delay through the bearer network. Assuming the server has sufficient resources, and the client is an authorized client, during a time period 112 after receiving the request, the server generates a session identifier, and according to one embodiment of the invention, a compressed session identifier. The server then goes about returning 114 the session identifier and the compressed session identifier if generated. Finally, the client receives 116 the parameters sent by the server. In addition to the request and session identifier generation, other conventional communication session activities also occurs, such as negotiation, for example. It will also be understood that a client device can establish more than one session.

Referring now to FIG. 2, there is shown a system diagram of a mobile communication system 200, in accordance with the invention. A mobile station 202, such as, for example, an integrated services digital radio is a client 102, which uses a fixed network equipment (FNE) 204 over a wireless link 206 to communicate with a server 104. The fixed network equipment 204 comprises a base station 208. The base station 208 includes transceiver equipment and radio resources for establishing a serving cell in the local vicinity. The base station is operatively coupled to a plurality of cross-connect switches, such as, for example, a first cross-connect switch 210, a second cross-connect switch 212 and a third cross-connect switch 214. The cross-connect switches function to connect the client to the desired network. For example, the first cross-connect switch may be a telephone interconnect cross-connect switch, the second cross-connect switch may be a mobile data gateway, and the third cross-connect switch may be a circuit data cross-connect switch. The first, second, and third cross-connect switches are operatively coupled to the server by lines 216, 218, and 220, respectively. Each of the cross-connect switches may be coupled to other servers as well. The server may be a web server 222, for example. Each respective connection to the server represents a different bearer network.

In connecting to the server, the mobile station initiates a communication link with the base station 208. The type of communication link established determines which cross-connect switch or bearer network will be used in connecting to the server. Once a request is received from the mobile station, the base station forwards the information to the appropriate cross-connect switch, and then on to the server. The server then receives the request, and if resources are available, generates the session identifier and a compressed session identifier and returns these parameters over the bearer network to the base station, which then transmits it back to the mobile station. Additionally, once the link is established, the mobile station negotiates with the server for communication protocol configuration, such as the maximum receive buffer size. Device capability such as display characteristics can also be communicated to the server.

Referring now to FIG. 3, there is shown a flow chart diagram 300 for a method of compressing a session identifier to obtain a compressed session identifier in accordance to the present invention. At the start of the process 302, the server has received a communication session request from a client and has determined that sufficient resources are available to facilitate the communication session. The first step performed by the server is generating 304 a long session identifier. Typically, and according to the Wireless Application Protocol, the long session identifier is a 32 bit data word. Because of the length of the long session identifier it is not transmitted with each data packet or message. However, according to the invention, a compressed or abbreviated session identifier may be derived from the long session identifier. Accordingly, the next step in the process is compressing 306 the long session identifier. In a preferred embodiment of the invention, the step of compressing the long session identifier comprises truncating the long session identifier to the lowest significant byte. Hence, only 8 bits are used instead of 32 bits, which significantly reduces the amount of overhead information which is sent with each message. When using a fewer number of bits in the compressed session identifier, the server must perform the step of determining 308 if the compressed session identifier is already in use. To do this, the server simply searches a database of currently active compressed session identifiers in use for the mobile station. If the compressed session identifier is already in use, the server returns to step of generating a long session identifier. If the compressed session identifier is not in use, then the server returns the long session identifier and the compressed session identifier to the client and the server performs the step of recording 310 the session identifier and the compressed session identifier. Once the session identifier and compressed session identifier and compressed session identifier has been stored, the server sends them on to the client through the bearer network over which the session was established.

Once the client has received the session parameters from the server and complete capability negotiation with the server, communication between the client and server commences. Messages or data packets are then transmitted between the client and the server. Each message or data packet has a structure as shown in FIG. 4, which shows a data packet structure 400 according to the present invention. Each packet preferably comprises the compressed session identifier 402, an envelope identifier 404, and a data payload 406. Additionally each packet may comprise overhead data 408. The envelope identifier is a peer address quadruplet including the client address, the client port number, the server address, and the sever port number. Although in the preferred embodiment each packet includes the compressed session identifier and envelope identifier, it is contemplated that messages may be sent without the compressed session identifier. In the process of communicating, the server uses either the compressed session identifier, or the envelope identifier, or both, to determine to which session each received packet belongs. The server and client addresses are also used by other network entities between the server and client for routing purposes.

During the course of communicating, the session may be interrupted for one of several reasons. For example, the server may suspend the communication session for any one of several reasons. The server may also suspend the communication session in other to redirect the session to another sever. The client may also initiate a suspension of the communication session. The bearer network may also initiate a suspension. When it is desired by any of the network entities, including the server, the client, or bearer network, the suspension request is transmitted to the other network entities. The communication session may also be interrupted when, for example, the connection between the client and the bearer network is broken. The breaking of the connection may occur if the client travels out of range of the base station or, for example, if the battery of the mobile station is no longer able to power the mobile station. Breaks may also occur in the network due to errors in executing network operations, or failures in network equipment.

Figure 6:
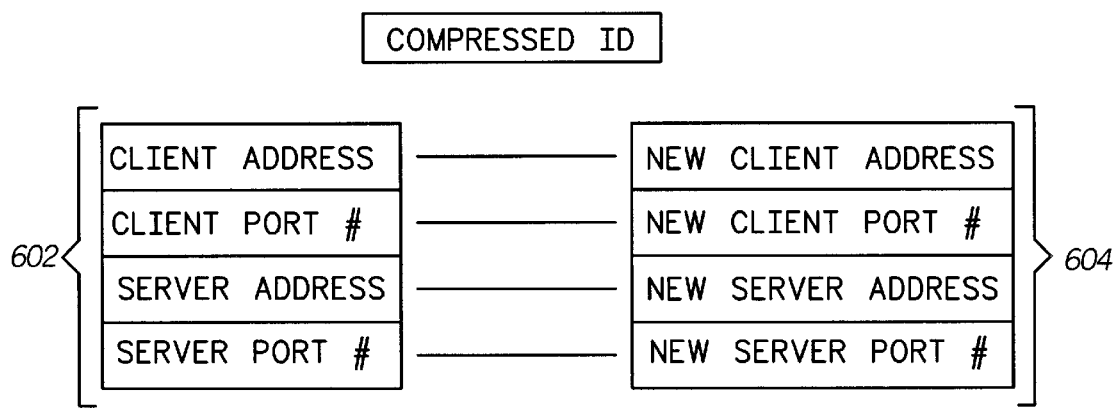
FIG. 6 shows a flow chart diagram describing a method for providing seamless communication across bearers in a wireless communication system, in accordance with the invention.
Figure 5:
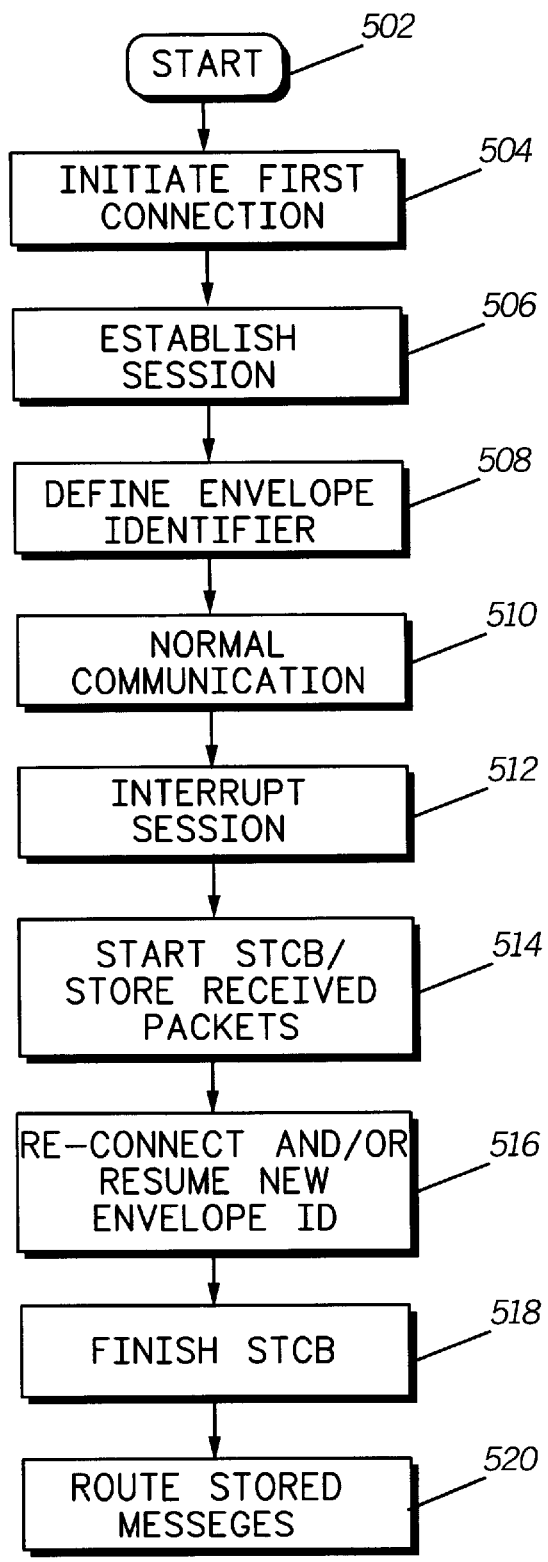
FIG. 5 shows one embodiment of a session transition control block, in accordance with the invention.

Referring now to FIG. 5, there is shown a flow chart diagram 500 describing a method for providing a seamless communication session in a wireless communication system, in accordance with the present invention. At the start 502 of the method it has been determined that a communication session is desired. According to the present invention, the first step initiating 504 a first connection. The step of initiating the first connection comprises setting up a communication link between the mobile station and the base station, and defining a channel between the base station and the desired server. Once the first connection is established, the client may then transmit a request for a communication session to the server. Hence, the next step is establishing (506) a communication session between the client and the server. Hence the session parameters have been defined by the server and the communications protocol have been negotiated between the client and the server, the step of defining 508 a first envelope identifier is accomplished. The first envelope identifier is stored at both the server and the client and used to mark and receive messages or data packets sent between the client and the server. Additionally, the server uses the first envelope identifier to determine to which session the received messages belong. This occurs during the course of normal communication 510 between the server and client. During the communication session interrupting 512 of the session may occur. The interruption may be the result of a suspension request by one of the network entities or due to a break in the communications link between the client and the server. Regardless of the reason for the interruption, according to the invention both the server and client perform the steps of starting or creating 514 a session transition control block. The session transition control block uses the compressed session identifier as a key. The session transition control block according to invention is shown in FIG. 6, the session transition control block includes a first envelope identifier 602 which includes the peer address quadruplet. The first envelope identifier is stored in a memory at both the client and the server using preferably the compressed session identifier as a key. At the same time, messages or data packets may be received at either the server, the client, or both, which are stored their respective receiving network entities. Also, the client and server begin a timer. If the session is not resumed prior to the expiration of the timer, then all stored messages or data packets belong to the session to corresponding to the compressed session identifier or the first envelope identifier will be discarded. After the interruption has occurred the session may resume. This may occur, for example, by reconnecting 516 or establishing a second connection between the mobile station and the server under the session established during the first connection. The session may also be resumed upon issuing a resume command if the session have merely been suspended. The session may be resumed over a different over a different bearer network, or the session may be established over the same bearer network but with different network parameters. An example, of the second case would be when dynamic addressing is used by the bearer network to identify a client, as in the case of point-to-point protocol circuit data connections. Hence, a second envelope identifier is defined. As shown in FIG. 6, the second envelope identifier 604 also includes a new client address, a new client port number, a new server address and a new server port number. It may be that several of the elements in the second envelope identifier are the same as in the first envelope identifier. In resuming the communication session, messages or data packets send between the client an server are marked with the second envelope identifier. Once a message or data packet have been received with the second envelope identifier, the client and server used the compressed session identifier as a feed to perform the step of finishing 518, the session transition control block. The server and client then bind the second envelope identifier to the session identifier so as to identify all messages received from thereon. The server and client also use the session transition control block to route or redirect those messages that have been stored during the interruption of communication having the first envelop identifier. Hence, the present invention provides for a way to resolve the problem of lingering messages and alias resolution, providing a seamless communication over multiple bearers.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for providing seamless communication between a server and a client across bearers in a wireless communication system, comprising the steps of:

sending from the client to the server a session connect request;

receiving at the server the session connect request;

generating a session identifier and a compressed session identifier at the server;

sending, to the client from the server, the compressed session identifier;

commencing to send messages between the server and the client over a first bearer network, each message containing the compressed session identifier and a first envelope identifier;

interrupting the commencing;

resuming the sending of messages over a second bearer network using a second envelope identifier;

creating a session transition control block having a key at both the server and the client to link the first envelope identifier to the second envelope identifier; and receiving at least one message at either the client or the server after the interrupting, the at least one message having the first envelope identifier, the message matched to the session identifier using the session transition control block.

2. A method for providing seamless communication as defined in claim 1, wherein the step of interrupting comprises sending a suspend request from the client to the server.

3. A method for providing seamless communication as defined in claim 1, wherein the step of interrupting comprises sending a suspend request from the server to the client.

4. A method for providing seamless communication as defined in claim 1, wherein the step of interrupting comprises sending a disconnect message from the first bearer to the server.

5. A method for providing seamless communication as defined in claim 1, wherein the step of interrupting comprises sending a suspend request with redirection from the server to the client.

6. A method for seamless communication between a mobile station and a server in a wireless communication system, the method comprising:

initiating a first connection over the wireless communication system between the mobile station and the server;

establishing a session by the server, including generating a session identifier and a compressed session identifier;

sending the session identifier and the compressed session identifier to the mobile station;

defining a first envelope identifier to identify a message sent between the mobile station and the server;

breaking the first connection;

upon receiving an indication that the first connection has been broken, starting a session transition control block at both the mobile station and the server using the compressed session identifier as a key;

establishing a second connection between the mobile station and the server under the session established during the first connection;

defining a second envelope identifier upon completing the step of establishing the second connection;

completing the session transition control blocks at both the mobile station and the server by mapping the first envelop identifier to the second envelope identifier; and replacing the first envelope identifier of a lingering message with the second identifier.

7. A method for providing seamless communication as defined in claim 6, wherein the step of breaking the first connection comprises sending a suspend request from the client to the server.

8. A method for providing seamless communication as defined in claim 6, wherein the step of breaking the first connection comprises sending a suspend request from the server to the client.

9. A method for providing seamless communication as defined in claim 6, wherein the step of breaking the first connection comprises sending a disconnect message from the first bearer to the server.

10. A method for providing seamless communication as defined in claim 6, wherein the step of breaking the first connection comprises sending a suspend request with redirection from the server to the client.

11. In a wireless communication system having a communication session established between a first peer and a second peer, a session identifier used to identify the communication session, a first envelope identifier used to mark messages sent between first and second peers over a first wireless connection between the first and second peers, a method for seamlessly continuing the communication session upon breaking the first connection, comprising the steps of:

starting, at both the first and second peer, a session transition control block having a key;

storing any messages received at the first and second peer marked with the first envelope identifier;

establishing a second connection between the first and second peer resulting in a second envelope identifier;

updating the session transition control block at the first and second peers; and updating the stored message received at the first and second peer marked with the first envelope identifier with the second envelope identifier.

* * * * *